United States Patent
Ishizu

(10) Patent No.: US 11,532,251 B2
(45) Date of Patent: Dec. 20, 2022

(54) DISPLAY SYSTEM, DISPLAY DEVICE, AND DISPLAY METHOD

(71) Applicant: Taeko Ishizu, Kanagawa (JP)

(72) Inventor: Taeko Ishizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/443,973

(22) Filed: Jul. 29, 2021

(65) Prior Publication Data

US 2022/0108639 A1  Apr. 7, 2022

(30) Foreign Application Priority Data

Oct. 7, 2020  (JP) .............................. JP2020-170069

(51) Int. Cl.
| | |
|---|---|
| *G09G 3/00* | (2006.01) |
| *H04N 9/31* | (2006.01) |
| *G09G 5/12* | (2006.01) |
| *G06F 3/16* | (2006.01) |

(52) U.S. Cl.
CPC ............. *G09G 3/001* (2013.01); *G06F 3/165* (2013.01); *G09G 5/12* (2013.01); *H04N 9/3147* (2013.01); *G09G 2370/022* (2013.01)

(58) Field of Classification Search
CPC ...... G06F 3/1446; G06F 3/1423; G06F 3/165; G09G 5/12; G09G 2370/022; H04N 9/3147
See application file for complete search history.

(56) References Cited

U.S. PATENT DOCUMENTS

| | | | |
|---|---|---|---|
| 2011/0123062 A1* | 5/2011 | Hilu | G06Q 30/02 382/100 |
| 2016/0080788 A1 | 3/2016 | Ozaki et al. | |
| 2016/0337409 A1 | 11/2016 | Oyamada et al. | |
| 2017/0154452 A1 | 6/2017 | Ishizu et al. | |
| 2017/0178290 A1 | 6/2017 | Sugiura et al. | |
| 2017/0186407 A1 | 6/2017 | Mano et al. | |
| 2018/0060009 A1* | 3/2018 | Peshkar | G06F 3/1423 |
| 2018/0167662 A1* | 6/2018 | Mahadevan | H04N 21/4334 |

FOREIGN PATENT DOCUMENTS

| | | |
|---|---|---|
| JP | 2016-085435 | 5/2016 |
| JP | 2017-229043 | 12/2017 |

* cited by examiner

*Primary Examiner* — Shaheda A Abdin
(74) *Attorney, Agent, or Firm* — IPUSA, PLLC

(57) ABSTRACT

A display system includes a plurality of display devices each of which includes circuitry. The circuitry of each of the plurality of display devices synchronizes a reproduction time with other of the plurality of display devices. The reproduction time is a time to reproduce content including an image and audio. The circuitry further starts displaying the image at a predetermined time and starts outputting the audio at the predetermined time. In response to detection of one of a failure and a probability of failure to output the audio at the predetermined time, the circuitry further stops outputting the audio.

8 Claims, 14 Drawing Sheets

DISPLAY SYSTEM, DISPLAY DEVICE, AND DISPLAY METHOD

CROSS-REFERENCE TO RELATED APPLICATION

This patent application is based on and claims priority pursuant to 35 U.S.C. § 119(a) to Japanese Patent Application No. 2020-170069, filed on Oct. 7, 2020, in the Japan Patent Office, the entire disclosure of which is hereby incorporated by reference.

BACKGROUND

Technical Field

Embodiments of the present disclosure relate to a display system, a display device, and a display method.

Related Art

There is known a multi-projection system that displays an image (a moving image or a still image) on a large screen using a plurality of projectors.

For example, such a multi-projection system uses a plurality of projectors to display an image represented by data included in input content data and output audio, or sound, synchronized with (corresponding to) the image.

In addition, as another example, there is an image processing system that implements multi-projection by connecting a plurality of projectors and an information processing device that controls the plurality of projectors by wireless communications.

The above-described conventional multi-projection system has a configuration in which the plurality of projectors and an information processing device that controls the plurality of projectors are connected by wired communications, and is premised on that the plurality of projectors concurrently output the audio.

SUMMARY

An exemplary embodiment of the present disclosure includes a display system including a plurality of display devices each of which includes circuitry. The circuitry of each of the plurality of display devices synchronizes a reproduction time with other of the plurality of display devices. The reproduction time is a time to reproduce content including an image and audio. The circuitry further starts displaying the image at a predetermined time and starts outputting the audio at the predetermined time. In response to detection of one of a failure and a probability of failure to output the audio at the predetermined time, the circuitry further stops outputting the audio.

Another embodiment of the present disclosure includes a display device including circuitry. The circuitry of each of the plurality of display devices synchronizes a reproduction time with other of the plurality of display devices. The reproduction time is a time to reproduce content including an image and audio. The circuitry further starts displaying the image at a predetermined time and starts outputting the audio at the predetermined time. In response to detection of one of a failure and a probability of failure to output the audio at the predetermined time, the circuitry further stops outputting the audio.

Another embodiment of the present disclosure includes a display method including starting displaying a corresponding part of an image at a predetermined time. The corresponding part of the image is included in content. The image is displayed by a plurality of display devices synchronizing time to reproduce the content. The display method further includes starting outputting audio at the predetermined time. The audio is included in the content. In response to detection of one of a failure and a probability of failure to output the audio at the predetermined time, the method further includes stopping outputting the audio.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
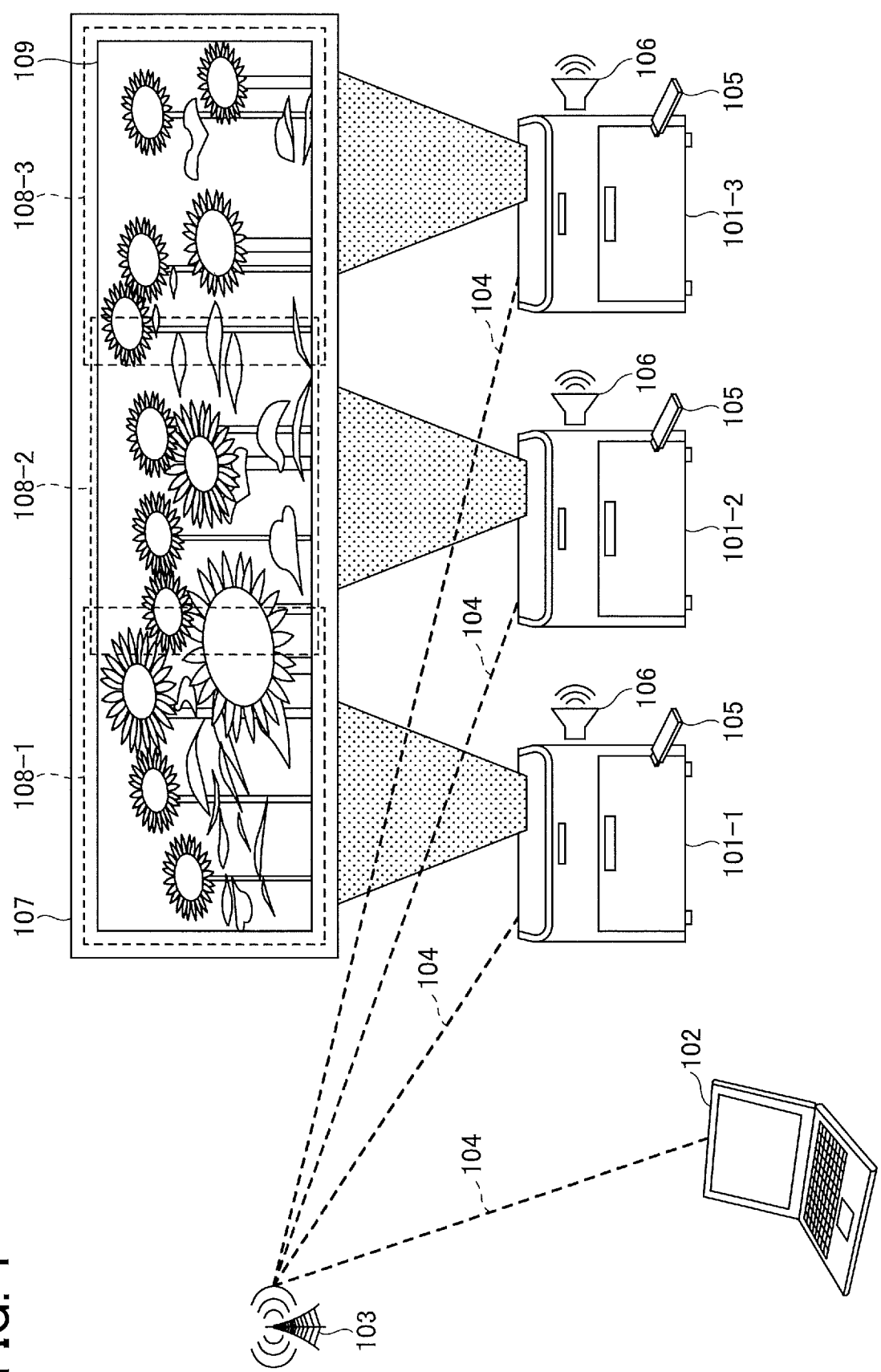
FIG. 1 is a diagram illustrating an example of a system configuration of a display system according to one or more embodiments.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of several embodiments of the present disclosure with reference to the attached drawings.

System Configuration:

FIG. 1 is a diagram illustrating an example of a system configuration of a display system according to one or more embodiments. The display system 100 includes, for example, a plurality of projectors 101-1, 101-2, and 101-3 and an information terminal 102. The plurality of projectors 101-1 to 101-3 and the information terminal 102 are communicably connected to each other by wireless communications 104 via an access point 103 of a wireless Local Area Network (LAN), for example. In the following description, a "projector 101" is used to indicate an arbitrary projector among the plurality of projectors 101-1 to 101-3. The number of the plurality of projectors 101 illustrated in FIG. 1 is three, which is an example, and the number of the plurality of projectors 101 may be two or more than three.

The projector (display device) 101 is an image projection device that displays (projects) an image (moving image or still image) on a projection plane 107. In the example of FIG. 1, an external storage device such as a Universal Serial Bus (USB) memory 105 is connected to each projector 101. The USB memory 105 is an example of a storage device that stores content to be displayed (projected) by the projector 101. The storage device that stores the content to be displayed by the projector 101 may be, for example, a storage device (memory) inside the projector 101 or a storage server on a network. In the following description, the USB memory 105 is used as an example of the storage device that stores the content to be displayed by the projector 101.

The USB memory 105 connected to each projector 101 stores image data for displaying (projecting) an image on the projection plane 107 by the corresponding projector 101 and audio data for outputting audio from a speaker 106 are stored in advance. For example, the USB memory 105 connected to the projector 101-1 stores image data representing a moving image to be displayed in a projection range 108-1 corresponding to the projector 101-1 among a moving image 109 to be displayed on the projection plane 107 and audio data representing audio to be output synchronized with the moving image. The USB memory 105 connected to the projector 101-2 stores image data representing a moving image to be displayed in a projection range 108-2 corresponding to the projector 101-2 among the moving image 109 to be displayed on the projection plane 107 and audio data representing audio to be output synchronized with the moving image. The USB memory 105 connected to the projector 101-3 stores image data representing a moving image to be displayed in a projection range 108-3 corresponding to the projector 101-3 among the moving image 109 to be displayed on the projection plane 107 and audio data representing audio to be output synchronized with the moving image.

The image data and the audio data (hereinafter collectively referred to as content data) stored in the USB memory 105 connected to each projector 101 may be generated by any desired known method. One or more embodiments described here are to solve a problem occurring in reproducing content (in performing reproduction of content) by the display system 100 as illustrated in FIG. 1. Any method is applicable to generate the content data. Accordingly, a description of how to generate the content data stored in the USB memory 105 is omitted. In addition, in the following description, the reproduction of the content data (content), or reproducing the content data (content) indicates displaying an image (ex. moving image) represented by the image data included in the content data or outputting audio represented by the audio data included in the content data.

The information terminal 102 is an information processing device such as a personal computer (PC), a smartphone, or a tablet terminal used by a user. The information terminal 102 executes an application program (hereinafter referred to as an application or an app) corresponding to the display system 100 to control image display and audio output by the plurality of projectors 101-1 to 101-3. For example, the information terminal 102 transmits a reproduction instruction including a reproduction start time at which reproduction of content data starts to the plurality of projectors 101-1 to 101-3 in response to a user operation. The information terminal 102 also controls the volume of the audio output from the plurality of projectors 101-1 to 101-3.

In the above-described system configuration, each projector 101 performs time synchronization with the other projectors 101 using the wireless communications 104. As a specific example, the projector 101-1 serves as a time synchronization server, and the other projectors 101-2 and 101-3 serve as time synchronization clients. The plurality of projectors 101-2 and 101-3 communicate with the projector 101-1 by wireless communications 104 and synchronize the time with the projector 101-1 by a time synchronization protocol such as a Network Time Protocol (NTP).

For example, when the reproduction start time notified from the information terminal 102 comes, each projector 101 displays at least a part of the moving image 109 using the content data stored in the USB memory 105 and outputs the audio corresponding to the moving image 109.

However, as illustrated in FIG. 1, in the display system 100 in which the time is synchronized between the plurality of projectors 101 by the wireless communications 104, a time difference in outputting the image and audio that are reproduced by each projector 101 may occur due to interference or delay in relation to the wireless communications 104. In such a case, since the user is more likely to perceive the error of time difference occurring in audio reproduction than the error of time difference occurring in relation to the moving image 109, the user may feel uncomfortable with the error of time difference occurring in the audio reproduction.

Accordingly, the display system 100 according to the present embodiment stops or cancels the audio output of the projector 101-3, for example, when the projector 101-3 fails to start outputting the audio at a predetermined time or when there is a probability that the projector 101-3 fails to start outputting the audio at the predetermined time. Due to this, for example, the projectors 101-1 and 101-2 that are able to start outputting the audio at the predetermined time output the audio in the display system 100, and this prevents the plurality of projectors 101 from individually outputting the audio at reproduction times different from each other. The predetermined time is a reproduction start time defined in a reproduction instruction, which is described later, and may be set by a user.

In one or more embodiments, in a case that the display system 100 stops or cancels the audio output of the projector 101-3, the display system 100 increases the volume of the audio output from the projectors 101-1 and 101-2 so that the volume of the audio output from the plurality of projectors 101-1 to 101-3 as a whole does not decrease. In one or more embodiments, in another case that the display system 100 stops or cancels the audio output of the projector 101-2 and the projector 101-3, the display system 100 increases the volume of the audio output from the projectors 101-1 so that the volume of the audio output from the plurality of projectors 101-1 to 101-3 as a whole does not decrease.

As described above, in the display system 100 according to the present embodiment, even when any of the plurality of projectors 101 fails to start outputting the audio at a predetermined time, it is possible to prevent a lag in the audio output from the plurality of projectors 101. In addition, for example, even when the projector 101-3 stops or cancels outputting the audio, the display system 100 increases the volume of the other projectors 101-1 and 101-2 and maintains a certain amount of volume of the audio output from the entire display system 100.

The system configuration of the display system 100 illustrated in FIG. 1 is an example. For example, in some embodiments, one of the plurality of projectors 101-1 to 101-3 (for example, the projector 101-1) may have a function of the information terminal 102. In some embodiments, the display system 100 may display the moving image 109 by using a plurality of display devices each of which includes a display in alternative to the plurality of projectors 101. Furthermore, in some embodiments, each projector 101 may store the content data in advance in a storage device built in the projector in alternative to using the USB memory 105. Furthermore, in some embodiments, some or all of the plurality of projectors 101-1 to 101-3 and the information terminal 102 may be connected to a network by wired communications.

Figure 2:
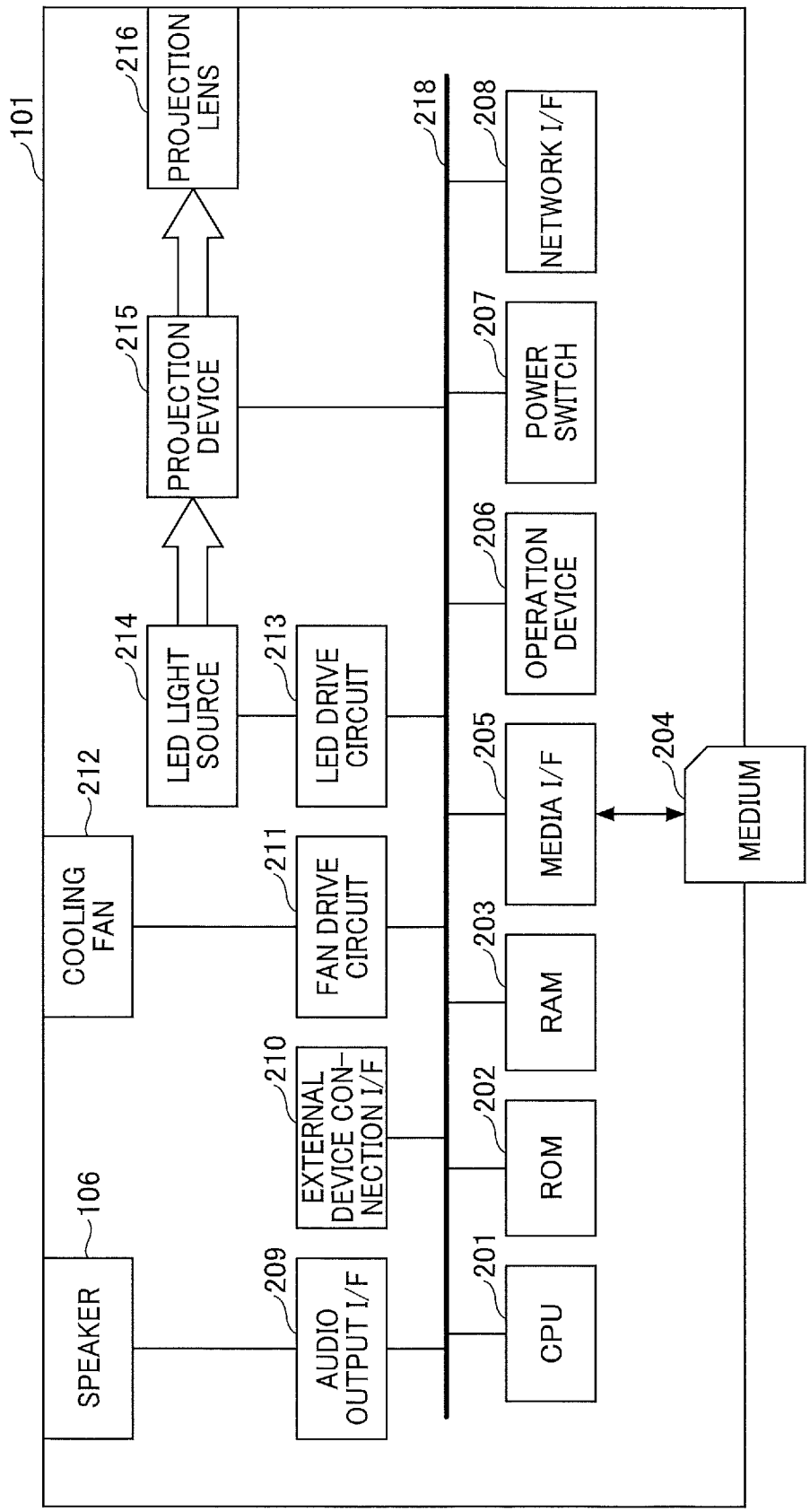
FIG. 2 is a block diagram illustrating an example of a hardware configuration of a projector according to one or more embodiments.

Hardware Configuration:
Hardware Configuration of Projector:

FIG. 2 is a block diagram illustrating an example of a hardware configuration of a projector according to one or more embodiments. As illustrated in FIG. 2, the projector 101 includes a central processing unit (CPU) 201, a read only memory (ROM) 202, a random access memory (RAM) 203, a media interface (I/F) 205, an operation device 206, a power switch 207, a network I/F 208, an audio output I/F 209, a speaker 106, an external device connection I/F 210, a fan drive circuit 211, a cooling fan 212, and a Light Emitting Diode (LED) drive circuit 213, an LED light source 214, a projection device 215, a projection lens 216, and a bus line 218.

The CPU 201 performs overall control of the projector 101. The ROM 202 stores a program for driving the CPU 201 such as an Initial Program Loader (IPL). The RAM 203 is used as a work area for the CPU 201. The media I/F 205 controls reading or writing (storing) of data from or to the medium 204, which is an external storage device such as the USB memory 105. The USB memory 105 may one that is to be connected to the external device connection I/F 210.

The operation device 206 is provided with various keys, buttons, LEDs, and the like, and is used for performing various operations other than controlling the power of the projector 101 by the user. For example, the operation device 206 receives an instruction operation such as an operation for adjusting a size of a projected image, an operation for adjusting a color tone, an operation for adjusting a focus, and an operation for adjusting a keystone, and outputs the received operation content to the CPU 201. The power switch 207 is a switch that receives an operation of turning on or off the power of the projector 101.

The network I/F 208 is an interface for connecting the projector 101 to a network, such as a wireless LAN or a wired LAN. The audio output I/F 209 is a circuit for outputting audio from the speaker 106 under the control of the CPU 201. The external device connection I/F 210 is an interface for connecting an external device (such as the information terminal 102 or the USB memory 105) to the projector 101.

The fan drive circuit 211 is connected to the CPU 201 and the cooling fan 212 and drives or stops the cooling fan 212 based on a control signal from the CPU 201. The cooling fan 212 exhausts the air inside the projector 101 by rotating to cool the inside of the projector 101.

The LED drive circuit 213 turns on and off of the LED light source 214 under the control of the CPU 201. When turned on under the control of the LED drive circuit 213, the LED light source 214 irradiates the projection device 215 with projection light. The image is projected on the projection surface of the screen. The projection device 215 transmits the modulated light obtained by modulating the projection light from the LED light source 214 by the spatial light modulation method based on the image data given through the external device connection I/F 210 and the like, through the projection lens 216. A liquid crystal panel or a Digital Micromirror Device (DMD) is used as the projection device 215, for example. The LED drive circuit 213, the LED light source 214, the projection device 215, and the projection lens 216 function as a projection unit that projects an image on a projection plane based on image data.

The bus line 218 that includes an address bus and a data bus. The bus line 218 electrically connects the above components, which are connected to the bus line 218 in FIG. 2, to each other and transmits various control signals.

In the above-described configuration, when the power is supplied, the CPU 201 activates in accordance with a control program, which is stored in the ROM 202 in advance, and supplies a control signal to the LED drive circuit 213 to turn on the LED light source 214. Further, the CPU 201 supplies a control signal to the fan drive circuit 211 to rotate the cooling fan 212 at a predetermined rated speed. Further, when the power supply is started, the projection device 215 enters an image displayable state, and the power is supplied to various other components in the projector 101.

When the power switch 207 of the projector 101 is turned off, a power-off signal is transmitted from the power switch 207 to the CPU 201. When detecting the power-off signal, the CPU 201 supplies a control signal to the LED drive circuit 213 to turn off the LED light source 214. Then the CPU 201 transmits a control signal to the fan drive circuit 211 to stop the cooling fan 212, terminates its own control processing, and finally transmits an instruction to the power supply circuit to stop the power supply.

The hardware configuration of the projector 101 illustrated in FIG. 2 is an example. For example, in some embodiments the projector 101 may include a built-in storage device.

Figure 3:
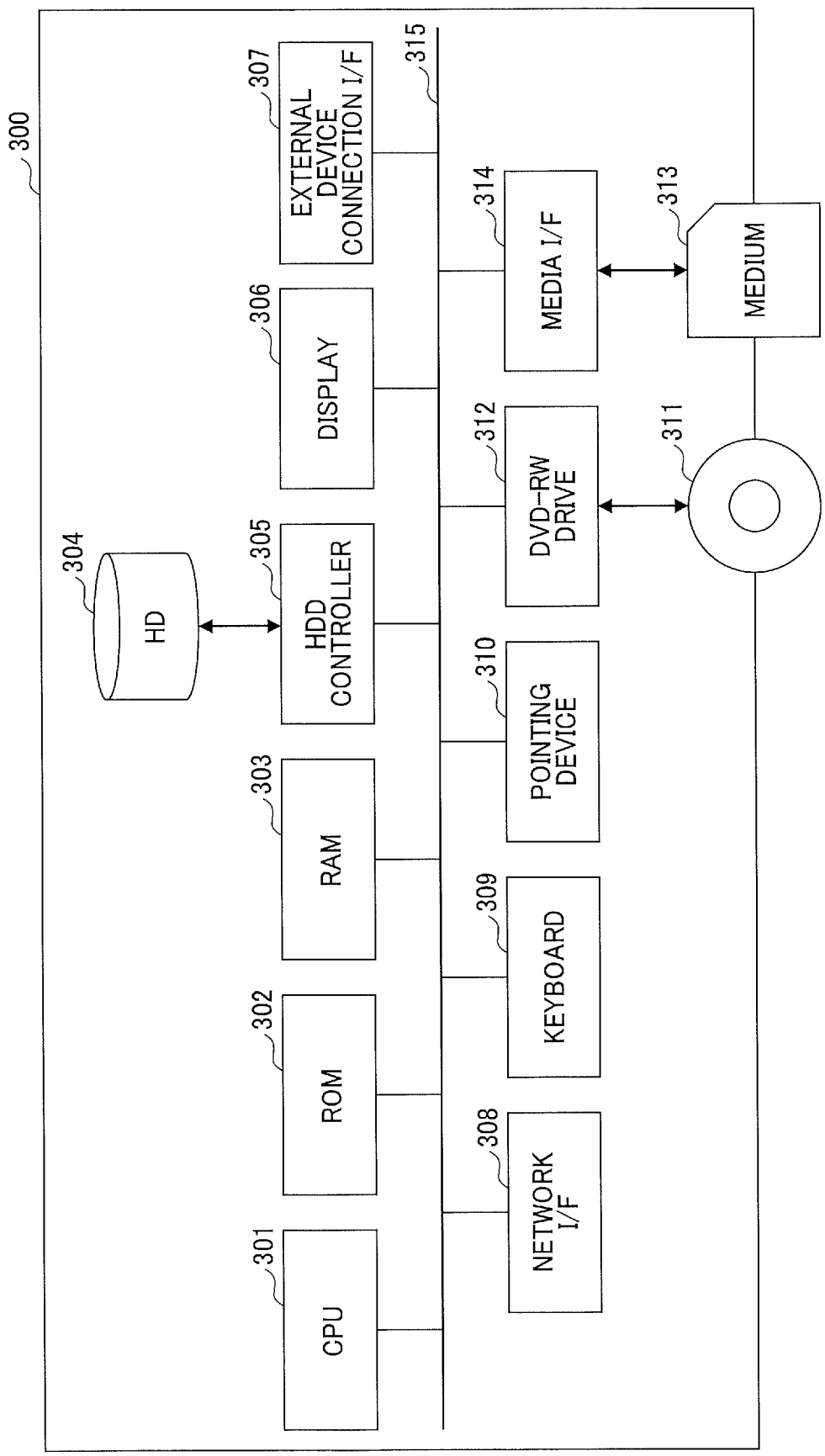
FIG. 3 is a block diagram illustrating an example of a hardware configuration of an information terminal according to one or more embodiments.

Hardware Configuration 1 of Information Terminal:

FIG. 3 is a block diagram illustrating an example of a hardware configuration of an information terminal according to one or more embodiments. FIG. 3 is an example of a hardware configuration of a PC 300 that is an example of the information terminal 102.

The PC 300 includes, for example, a CPU 301, a ROM 302, a RAM 303, a hard disk (HD) 304, a hard disk drive (HDD) controller 305, a display 306, an external device connection I/F 307, a network I/F 308, a keyboard 309, a pointing device 310, a digital versatile disk-rewritable (DVD-RW) drive 312, a media I/F 314, a bus line 315.

The CPU 301 performs overall control of the PC 300. The ROM 302 stores a program used for driving the CPU 301 such as an IPL. The RAM 303 is used as a work area for the CPU 301, for example. The HD 304 stores various data such as a program. The HDD controller 305 reads and writes various data from and to the HD 304 under the control of the CPU 301.

The display 306 displays various information such as a cursor, a menu, a window, a character, or an image. The external device connection I/F 307 is an interface for connecting an external device (for example, a camera or a USB memory) to the PC 300. The network I/F 308 is a communication interface for connecting the PC 300 to the access point 103, a communication network, or the like. The keyboard 309 is one example of an input device provided with a plurality of keys for allowing a user to input characters, numerals, or various instructions. The pointing device 310 is an example of an input device that allows a user to select or execute a specific instruction, select a target for processing, or move a cursor being displayed.

The DVD-RW drive 312 reads and writes various data from and to a DVD-RW 311, which is an example of a removable storage medium. The DVD-RW 311 is not limited to the DVD-RW and may be another recording medium. The media I/F 314 controls reading or writing (storage) of data to a medium 313 such as a flash memory or a memory card. The bus line 315 includes an address bus and a data bus. The bus line 315 electrically connects the above-described components to each another and transmits various control signals.

Figure 4:
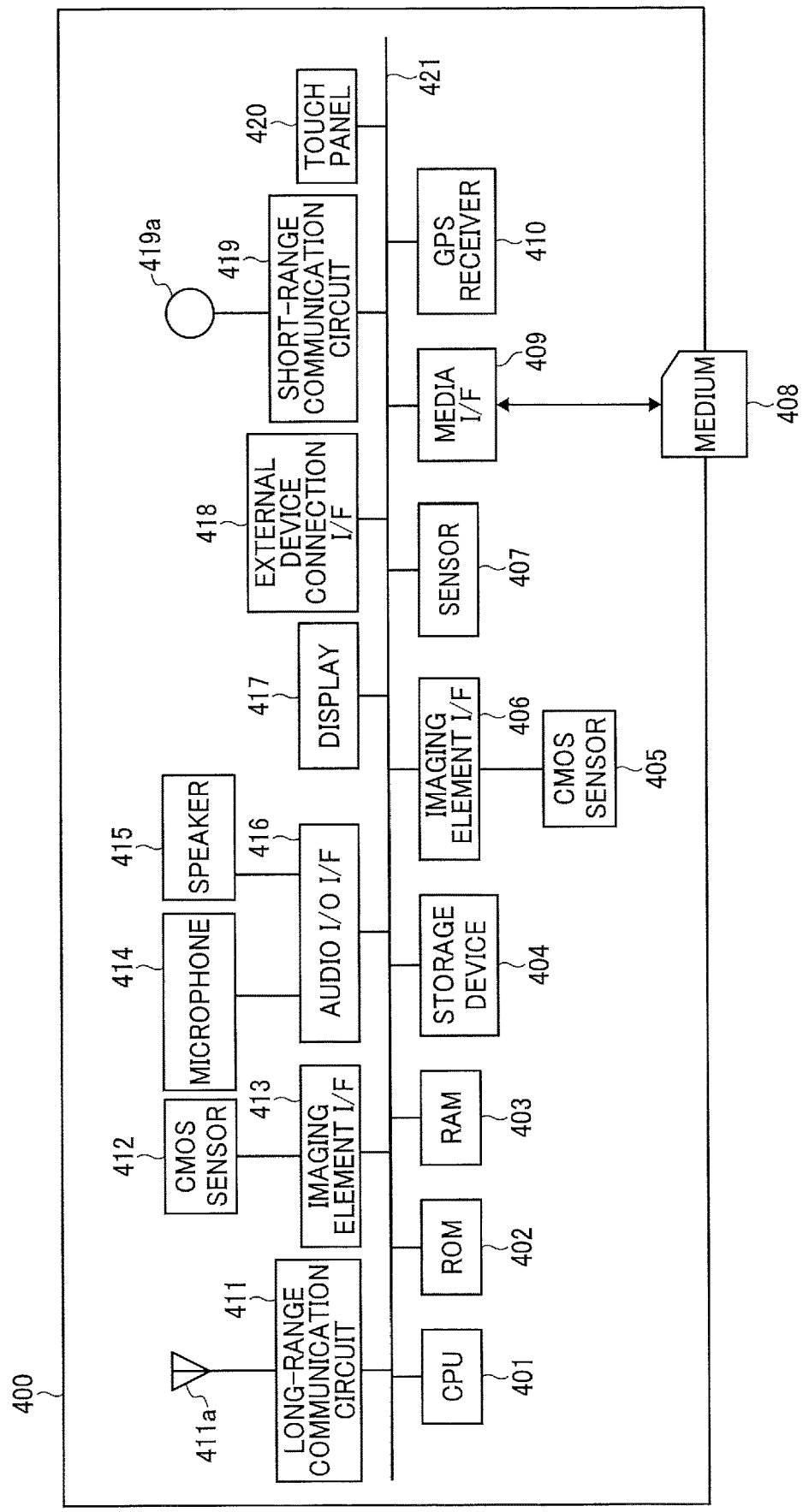
FIG. 4 is a block diagram illustrating another example of a hardware configuration of an information terminal according to one or more embodiments.

Hardware Configuration 2 of Information Terminal:

FIG. 4 is a block diagram illustrating an example of a hardware configuration of an information terminal according to one or more embodiments. FIG. 4 is an example of a hardware configuration of a portable terminal (mobile terminal) 400 that is an example of the information terminal 102.

As illustrated in FIG. 4, the portable terminal 400 includes a CPU 401, a ROM 402, a RAM 403, a storage device 404, a Complementary Metal Oxide Semiconductor (CMOS) sensor 405, an imaging element I/F 406, a sensor 407, a media I/F 409, and a Global Positioning System (GPS) receiver 410.

The CPU 401 performs overall control of the portable terminal 400 by executing a predetermined program. The ROM 402 stores a program used for driving the CPU 401 such as an IPL. The RAM 403 is used as a work area for the CPU 401. The storage device 404 is a large-capacity storage device (memory) that stores an Operating System (OS), a program such as an application, various types of data, and the like, and is implemented by, for example, a Solid State Drive (SSD), a flash ROM, or the like.

The CMOS sensor 405 is an example of a built-in imaging device capable of capturing a subject (mainly, a self-image of a user operating the portable terminal 400) under the control of the CPU 401. Note that the portable terminal 400 may include an imaging unit such as a Charge Coupled Device (CCD) sensor in alternative to the CMOS sensor 405. The imaging element I/F 406 is a circuit that drives the CMOS sensor 405. The sensor 407 includes various sensors such as an electromagnetic compass or gyrocompass for detecting geomagnetism and an acceleration sensor. The media I/F 409 controls reading or writing (storage) of data to the storage medium 408 such as a flash memory. The GPS receiver 410 receives a GPS signal from a GPS satellite.

The portable terminal 400 includes a long-range communication circuit 411, an antenna 411a for the long-range communication circuit 411, a CMOS sensor 412, an imaging element I/F 413, a microphone 414, a speaker 415, an audio input/output (I/O) I/F 416, a display 417, an external device connection I/F 418, a short-range communication circuit 419, an antenna 419a for the short-range communication circuit 419, and a touch panel 420.

The long-range communication circuit 411 is a communication interface for connecting the portable terminal 400 to a wireless LAN or a Wide Area Network (WAN) provided by the access point 103. The CMOS sensor 412 is an example of a built-in imaging device capable of capturing a subject under the control of the CPU 401. The imaging element I/F 413 is a circuit that controls driving of the CMOS sensor 412. The microphone 414 is a built-in circuit that converts sound into an electric signal. The speaker 415 is a built-in circuit that generates audio such as music or voice by converting an electric signal into physical vibration. The audio I/O I/F 416 is a circuit for inputting and outputting an audio signal between the microphone 414 and the speaker 415 under the control of the CPU 401.

The display 417 is an example of a display device that displays an image of the object, various icons, etc. Examples of the display 417 include a Liquid Crystal Display (LCD) and an organic Electro Luminescence (EL) display. The external device connection I/F 418 is an interface for connecting an external device (for example, a USB memory) to the portable terminal 400. The short-range communication circuit 419 is a circuit that performs short-range wireless communication. The touch panel 420 is an example of an input device that enables the user to input a user instruction to the portable terminal 400 through touching a screen of the display 417.

The portable terminal 400 further includes a bus line 421. The bus line 421 that includes an address bus and a data bus. The bus line 421 electrically connects the above components, which are connected to the bus line 421 in FIG. 4, to each other and transmits various control signals.

Figure 5:
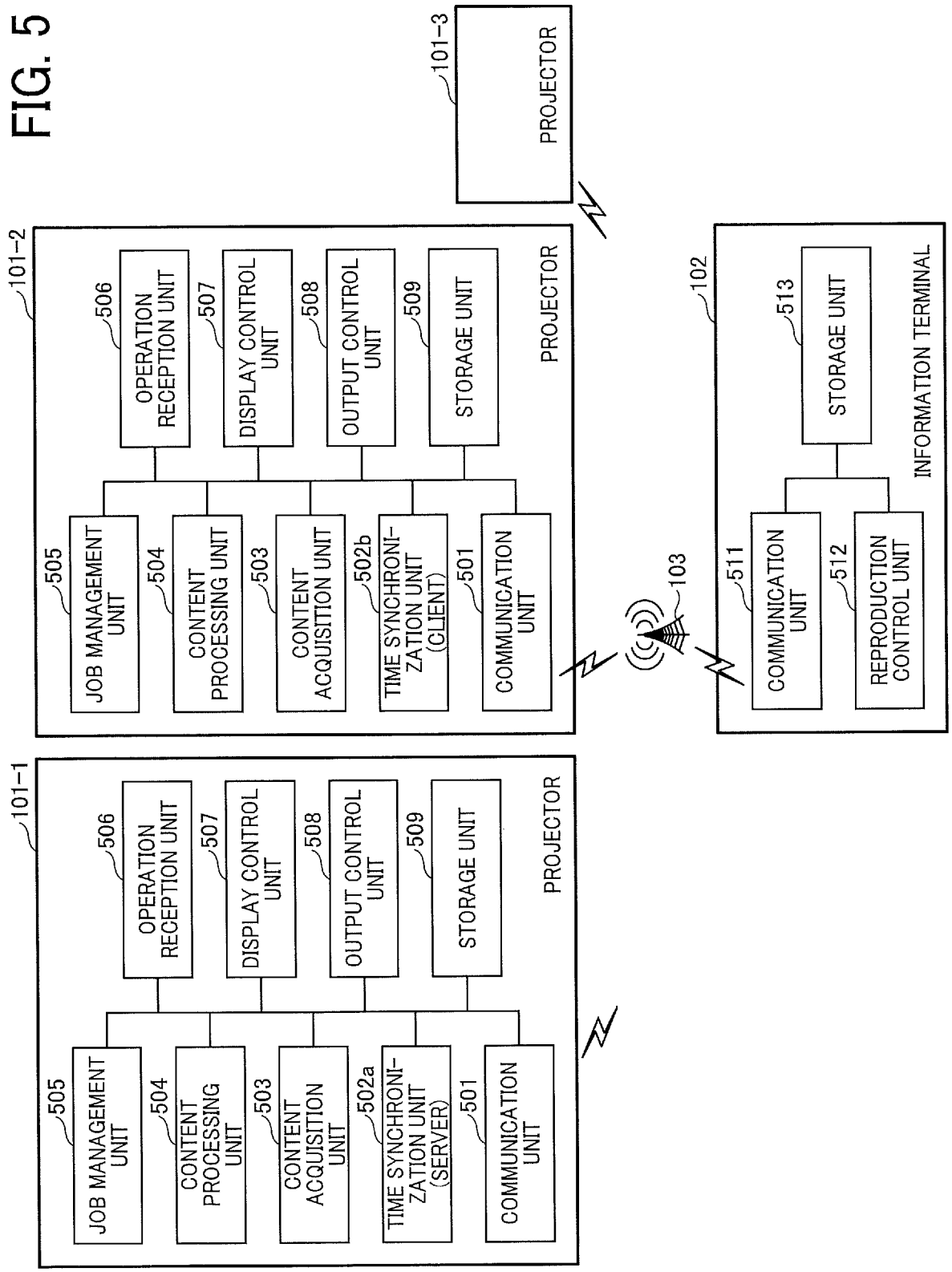
FIG. 5 is a block diagram illustrating an example of a functional configuration of a display system according to one or more embodiments.

Functional Configuration:

FIG. 5 is a block diagram illustrating an example of a functional configuration of a display system according to one or more embodiments. In FIG. 5, the projector 101-3 has substantially the same functional configuration as the projector 101-2.

Functional Configuration of Projector:

Each projector 101 includes, for example, a communication unit 501, a time synchronization unit 502, a content acquisition unit 503, a content processing unit 504, a job management unit 505, an operation reception unit 506, a display control unit 507, an output control unit 508, and a storage unit 509. Each of the functional units is implemented by execution of a program stored in the ROM 202 or the RAM 203 with the CPU 201 of FIG. 2, for example. At least a part of the above functional units may be implemented by hardware.

The communication unit 501 connects the projector 101 to a network using the network I/F 208 illustrated in FIG. 2, for example, and perform processing of communicating with another device. In the example of FIG. 5, the communication unit 501 connects the projector 101 to the access point 103 by wireless LAN communications.

The time synchronization unit 502 (502a or 502b) communicates with the other projectors 101 via the communication unit 501 and perform processing of synchronizing the time with the other projectors 101. In the example of FIG. 5, the time synchronization unit 502a of the projector 101-1 is set as a server (time synchronization server), and each time synchronization unit 502b of the projectors 101-2 and 101-3 is set as a client (time synchronization client). The time synchronization unit (client) 502b communicates with the time synchronization unit (server) 502a via the communication unit 501 and synchronizes the time with the time synchronization unit (server) 502a using a time synchronization protocol such as the NTP, for example.

The content acquisition unit 503 perform processing of acquiring the content data from the USB memory 105, for example. The content acquisition unit 503 is not limited to the USB memory 105, and may acquire content data from, for example, an internal (built-in) storage device of the projector 101 or an external storage server.

The content processing unit 504 executes processing of generating, from the content data acquired by the content acquisition unit 503, the image data to be reproduced by the display control unit 507 and the audio data to be reproduced by the output control unit 508. For example, when the content data is compressed, the content processing unit 504 decompresses the content data. In addition, the content processing unit 504 executes processing of separating the content data into the image data and the audio data, decoding the image data and the audio data, or scaling the image data in accordance with the resolution of the projector 101, as necessary.

The job management unit 505 performs processing of managing a job (image projection job) to be executed by the projector 101 to reproduce the content data including the image data and the audio data. For example, the job management unit 505 receives a reproduction instruction transmitted by a reproduction control unit 512. In addition, the job management unit 505 causes the content acquisition unit 503, the content processing unit 504, the display control unit 507, and the output control unit 508 to reproduce the content data at the reproduction start time, which is included in the reproduction instruction.

The operation reception unit 506 performs processing of receiving an operation performed by a user using, for example, the operation device 206 illustrated in FIG. 2.

The display control unit 507 performs processing of controlling display, for example, starts displaying an image using the image data processed by the content processing unit 504, at the reproduction start time (predetermined time) under the control of the job management unit 505. For example, in FIG. 1, the display control unit 507 of the projector 101-1 displays (projects) a part of the moving image 109 in the projection range 108-1 corresponding to the projector 101-1 at the reproduction start time. Similarly, the display control unit 507 of the projector 101-2 displays another part of the moving image 109 in the projection range 108-2 corresponding to the projector 101-2 at the reproduction start time. Note that the display control unit 507 may autonomously perform processing of controlling display without the control of the job management unit 505.

The output control unit 508 performs processing of controlling output, for example, starts outputting the audio using the audio data processed by the content processing unit 504 at the reproduction start time (predetermined time) under the control of the job management unit 505. When failing to start outputting the audio at the reproduction start time or when having a probability of failing to start outputting the audio at the reproduction start time, the output control unit 508 stops or cancels outputting the audio.

For example, in a case where the reproduction start time has already passed when the preparation for outputting the audio is completed, the output control unit 508 determines that the audio output is failed to be started at the reproduction start time and cancels the audio output. When failing to start outputting the audio at the reproduction start time, the output control unit 508 further notifies of the reproduction control unit 512 of a failure of outputting the audio, for example by transmitting an output failure notification indicating that the audio output is failed to be started.

In addition, when the communication unit 501 detects a disconnection from the network, the output control unit 508 may determine that there is a probability of failing to start outputting the audio at the reproduction start time, because the time synchronization is failed to be performed, and then cancel the audio output.

The storage unit 509 is implemented by, for example, a program executed by the CPU 201 and the RAM 203 (or another storage device included in the projector 101) and stores various pieces of information such as a reproduction instruction notified from the reproduction control unit 512.

Functional Configuration of Information Terminal:

In the information terminal 102, the communication unit 511, the reproduction control unit 512, the storage unit 513, and the like by a CPU (for example, the CPU 301 in FIG. 3 or the CPU 401 in FIG. 4) included in the information terminal 102 executing a predetermined program. At least a part of the above functional units may be implemented by hardware.

The communication unit 511 connects the information terminal 102 to a network using a communication interface (for example, the network I/F 308 in FIG. 3 or the long-range communication circuit 411 in FIG. 4) included in the information terminal 102 and performs processing for communicating with another device. In the example of FIG. 5, the communication unit 511 connects the projector 101 to the access point 103 by wireless LAN communications.

Figure 7:
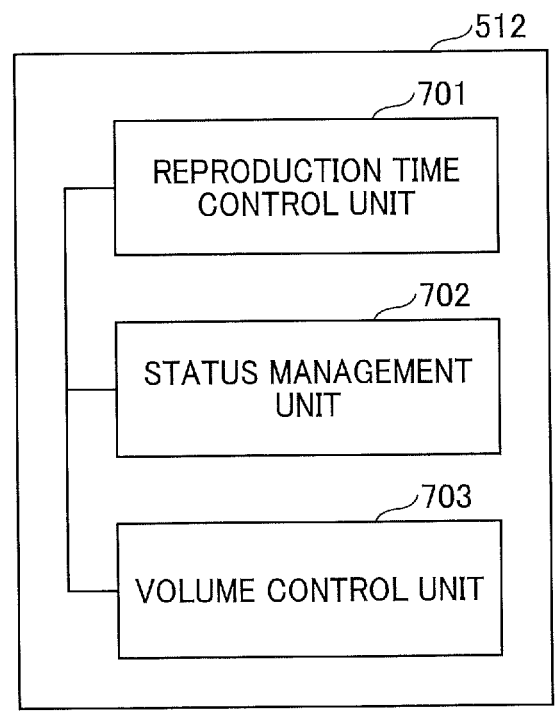
FIG. 7 is a block diagram illustrating an example of a functional configuration of a reproduction control unit according to one or more embodiments.

The reproduction control unit 512 controls reproduction of the content performed by the plurality of projectors 101-1 to 101-3. The reproduction of the content is for example, display of the moving image 109 and output of the audio corresponding to the moving image 109. The reproduction control unit 512 includes, for example, a reproduction time control unit 701, a status management unit 702, and a volume control unit 703 as illustrated in FIG. 7.

The reproduction time control unit 701 notifies the plurality of projectors 101-1 to 101-3 of the reproduction instruction including the reproduction start time of the content data in accordance with a setting set by a user operation or a schedule set in advance, for example.

The status management unit 702 manages a status of the plurality of projectors 101-1 to 101-3. For example, the status management unit 702 receives an output failure notification indicating that the projector 101 fails to start outputting the audio at the reproduction start time. Further, the status management unit 702 periodically checks whether the projector 101 is connected to the network.

The volume control unit 703 controls the volumes of the audio output from the plurality of projectors 101-1 to 101-3. For example, in a case that the volume control unit 703 stops or cancels the audio output of the projector 101-3, the volume control unit 703 increases the volume of the audio output from the projectors 101-1 and 101-2 so that the volume of the audio output from the plurality of projectors 101-1 to 101-3 as a whole does not decrease. In addition, in another case that the volume control unit 703 stops or cancels the audio output of the projector 101-2 and the projector 101-3, the volume control unit 703 increases the volume of the audio output from the projectors 101-1 so that the volume of the audio output from the plurality of projectors 101-1 to 101-3 as a whole does not decrease.

For example, the volume control unit 703 changes the volume of the projector 101 that outputs the audio as to satisfy the following formula. In the formula, the volume of the projector 101 that stops the audio output is indicated by V1, and the number of projectors 101 that output the audio is indicated by N.

The volume of the projector 101 that outputs the audio is changed such that (volume after change)=(volume before change)+(volume V1)/(number of projectors N). As a result, the volume of the audio output from the display system 100 as a whole does not change. That is, the change in the volume of the audio output from the display system 100 as a whole is controlled and suppressed.

The functional configuration of the display system 100 illustrated in FIG. 5 is an example. The display system 100 may have a functional configuration as illustrated in FIG. 6, for example.

Figure 6:
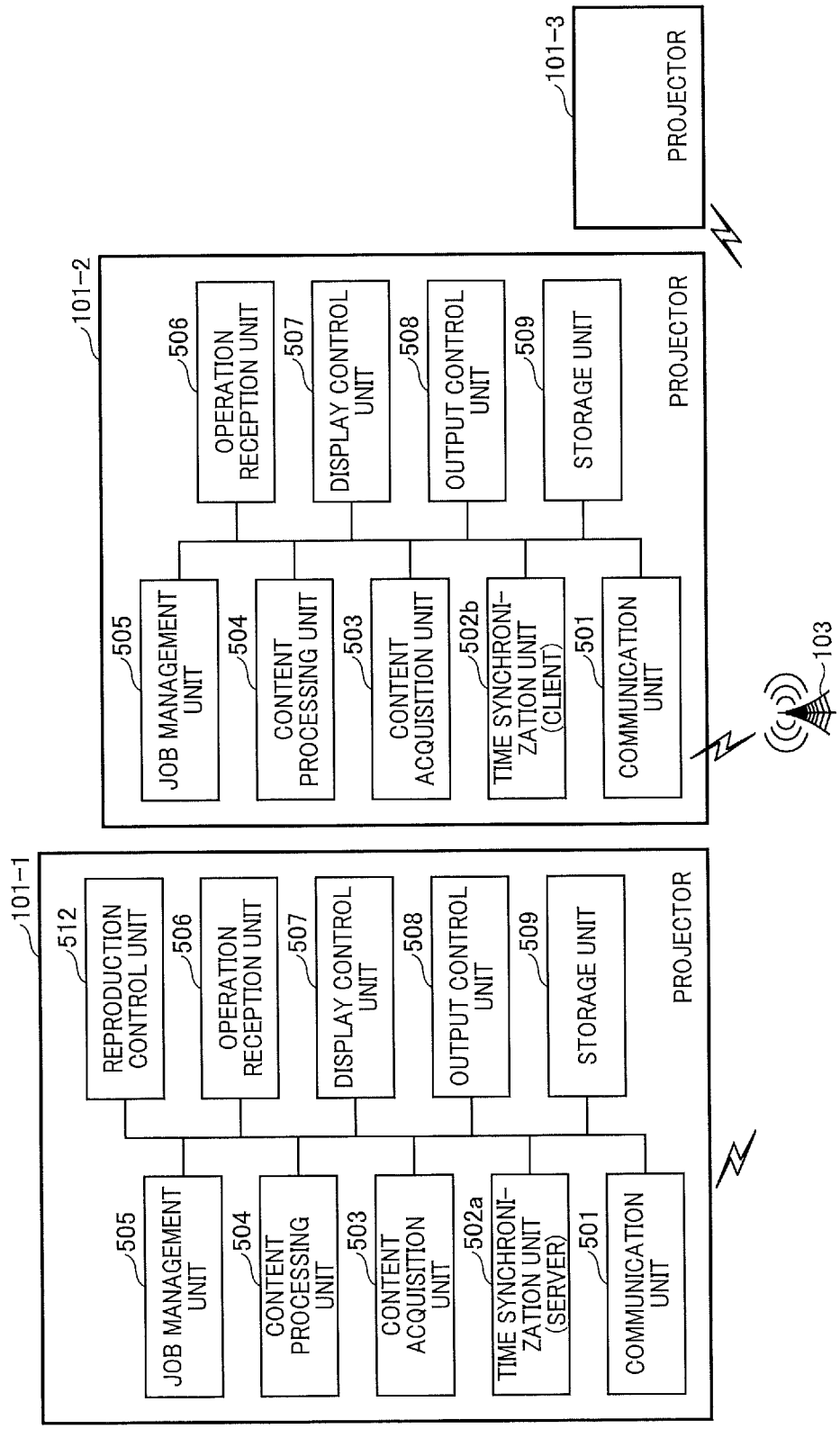
FIG. 6 is a block diagram illustrating another example of a functional configuration of a display system according to one or more embodiments.

In the example of FIG. 6, the projector 101-1 includes the reproduction control unit 512, which is included in the information terminal 102 in the example of FIG. 5. As described above, the display system 100 may not include the information terminal 102 when reproducing the content data.

Note that each functional configuration of the display system 100 illustrated in FIG. 5 and FIG. 6 is an example, and various modifications or applications are possible. For example, the projector 101-1 may include the time synchronization unit (client) 502b in alternative to the time synchronization unit (server) 502a. In this case, the time synchronization unit (client) 502b of the plurality of projectors 101-1 to 101-3 may synchronize the time using an external time synchronization server, for example. In addition, functions related to reproduction of the image data may be included in the display control unit 507 in alternative to being included in the content acquisition unit 503, the content processing unit 504, and the job management unit 505. In addition, functions related to reproduction of the audio data may be included in the output control unit 508 in alternative to being included in the content acquisition unit 503, the content processing unit 504, and the job management unit 505.

Process:

A description is given below of a processing flow of a display method according to the present embodiment.

First Embodiment

Figure 8:
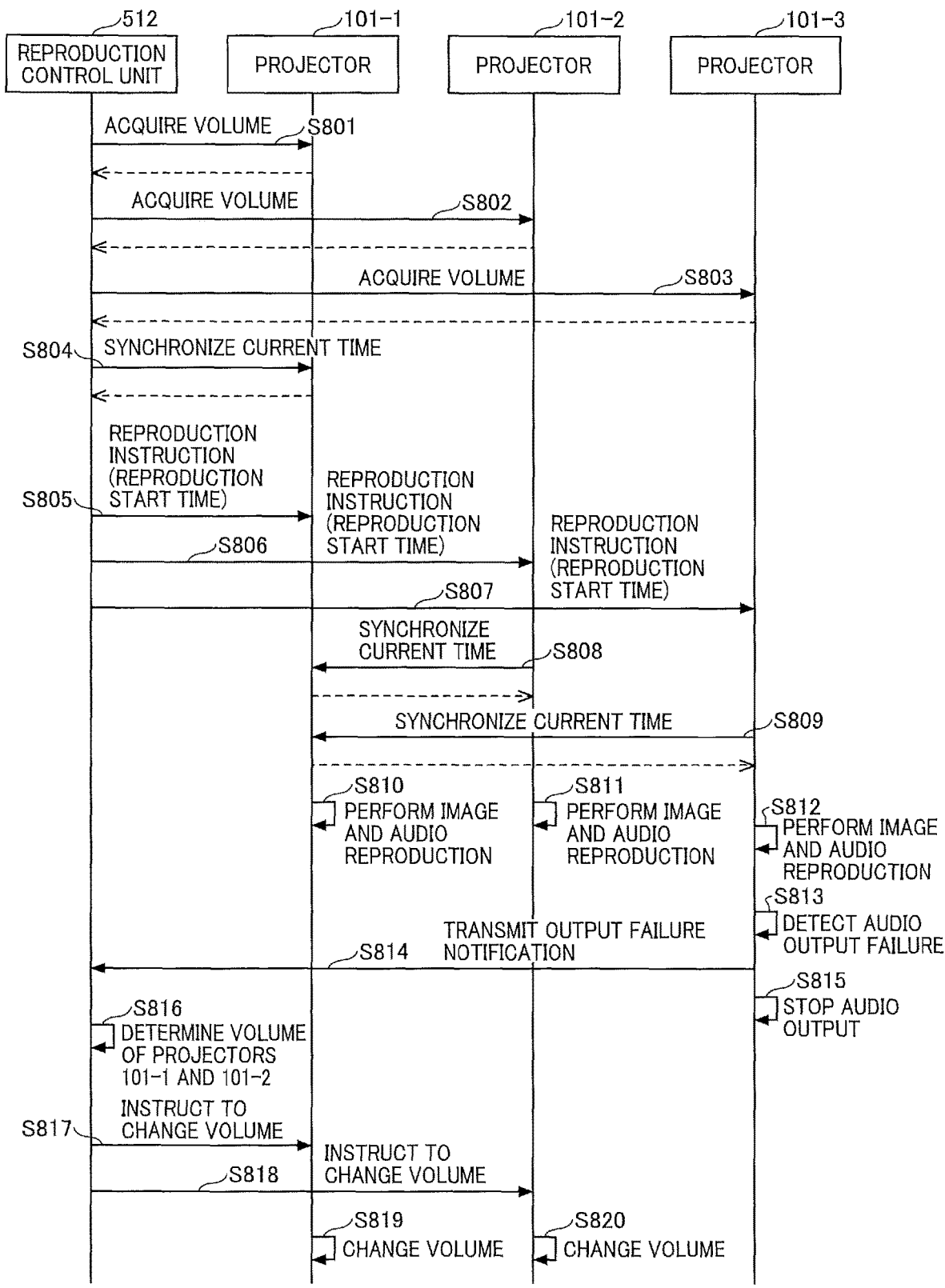
FIG. 8 is a sequence diagram illustrating an example of processing of a display system according to one or more embodiments.

Processing of Display System:

FIG. 8 is a sequence diagram illustrating an example of processing of a display system according to a first embodiment. To perform processing of the sequence diagrams illustrated in FIG. 8 and the subsequent figures, the reproduction control unit 512 may be included in the information terminal 102 as illustrated in FIG. 5 or may be included in the projector 101-1 or the like as illustrated in FIG. 6. In the description of the embodiments given herein, for ease of explanation, it is assumed that the reproduction control unit 512 is included in the information terminal 102.

In steps S801 to S803, the volume control unit 703 of the reproduction control unit 512 acquires, from each of the projectors 101-1 to 101-3, a volume setting (a preset value or a default value of volume) set for a corresponding one of the projectors 101, and the storage unit 513 stores the volume settings. Note that the volume, namely the preset value, of each projector 101 is set in advance to an appropriate value by a user or an administrator, for example.

In step S804, the reproduction time control unit 701 of the reproduction control unit 512 communicates with the time synchronization unit (server) 502a of the projector 101-1 via the communication unit 511 and synchronizes a current time with the projector 101-1 using a predetermined time synchronization protocol.

In steps S805 to S807, the reproduction time control unit 701 of the reproduction control unit 512 transmits a reproduction instruction including a reproduction start time to each of the projectors 101-1 to 101-3 via the communication unit 511.

In step S808, the time synchronization unit (client) 502b of the projector 101-2 communicates with the time synchronization unit (server) 502a of the projector 101-1 and synchronizes the current time with the projector 101-1 using the predetermined time synchronization protocol. In substantially the same manner, in step S809, the time synchronization unit (client) 502b of the projector 101-3 communicates with the time synchronization unit (server) 502a of the projector 101-1 and synchronizes the current time with the projector 101-1 using the predetermined time synchronization protocol.

Note that the information on the projector 101-1 to which the time synchronization unit (client) 502b of each of the projectors 101-2 and 101-3 is connected may be set in advance, or may be one instructed by the reproduction control unit 512 with the reproduction instruction, for example.

In steps S810 to S812, the job management unit 505 of each of the projectors 101-1 to 101-3 performs the reproduction processing of displaying (outputting) the moving image 109 and outputting the audio based on the content data stored in advance in the USB memory 105 or the like.

In the description of the present embodiment, it is assumed that the projectors 101-1 and 101-2 start displaying the moving image 109 and outputting the audio at the reproduction start time. In addition, it is assumed that the projector 101-3 detects that the audio output is failed to be performed at the reproduction start time in step S813.

Figure 9:
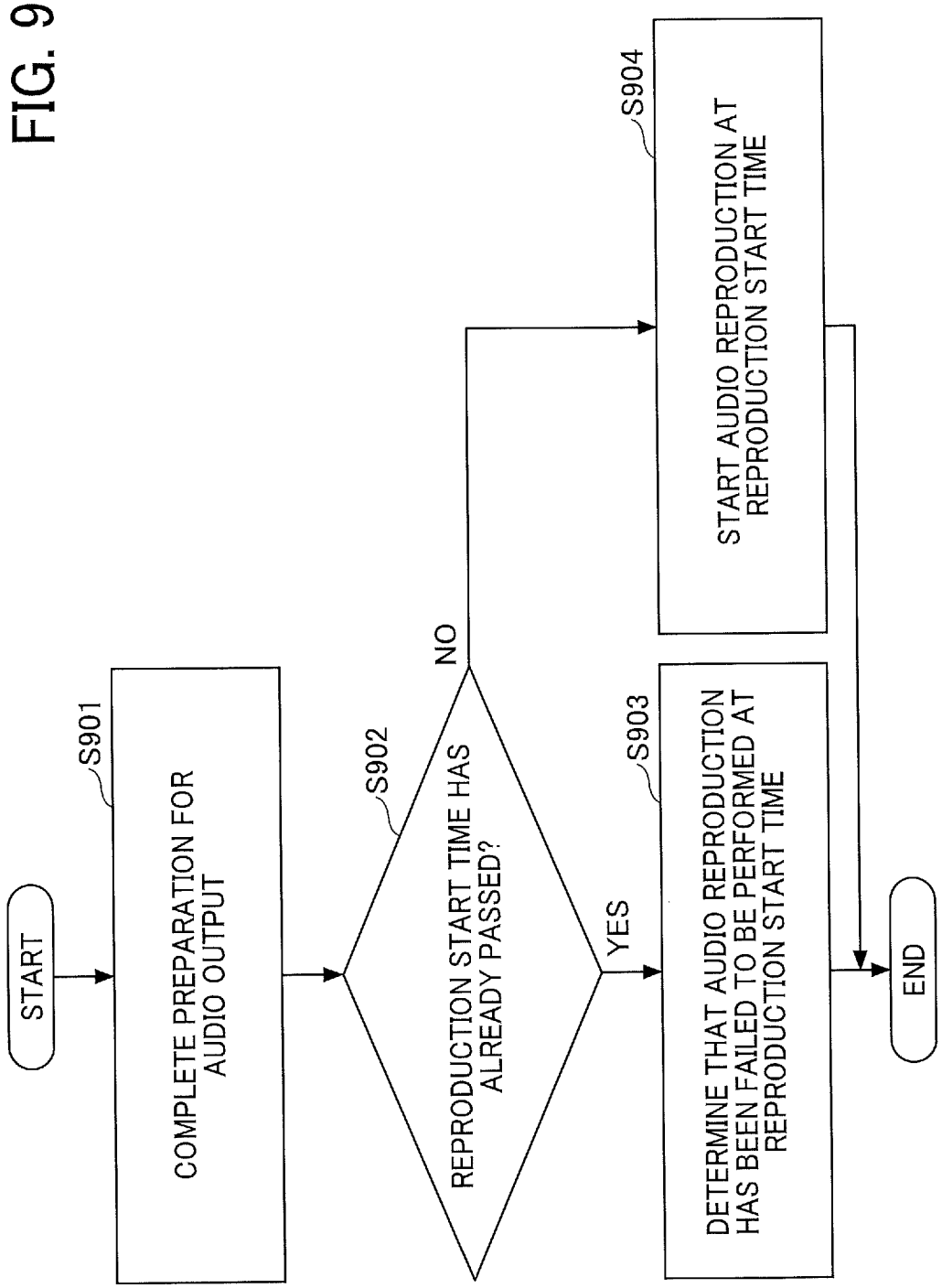
FIG. 9 is a flowchart illustrating an example of a process performed at a time of starting outputting audio according to one or more embodiments.

Such the detection indicating that the audio output is failed to be performed is detectable by each of the projectors 101 by performing a process at a time of start of the audio output, as illustrating in FIG. 9, for example. FIG. 9 is a flowchart illustrating an example of a process performed at a time of start of the audio output according to the first embodiment.

In step S901, when the output control unit 508 of the projector 101 completes preparation for the audio output, the output control unit 508 performs processing of step S902.

In step S902, the output control unit 508 determines whether the current time indicates that the reproduction start time, which is specified by the reproduction instruction, has already passed or not. The current time indicates that the reproduction start time has already passed, the process performed by the output control unit 508 proceeds to step S903. On the other hand, when the current time indicates that the reproduction start time has not passed yet, the process performed by the output control unit 508 proceeds to step S904.

In step S903, the output control unit 508 determines that the audio (sound) is failed to be reproduced at the reproduction start time. On the other hand, in step S904, the output control unit starts the audio output at the reproduction start time.

Referring back to FIG. 8, the description of the processing of the display system is continued to be given below.

In step S814, the output control unit 508 of the projector 101-3 transmits to the reproduction control unit 512 of an output failure notification indicating that the audio output is failed to be started at the reproduction start time. Note that the output control unit 508 may notify the reproduction control unit 512 of the output failure notification via the job management unit 505.

In step S815, the output control unit 508 of the projector 101-3 stops outputting the audio. In the description of the embodiment, stopping the audio output is not limited to stopping the reproduction processing of the audio, and may include various controls for making the audio inaudible to users, by for example, setting the volume of the audio to be output to a sufficiently small value.

In step S816, the volume control unit 703 of the reproduction control unit 512 determines a value set as the volume of each of the other projectors 101-1 and 101-2 in a manner that the volume of the audio output from each of the other projectors 101-1 and 101-2 is larger than a current value of volume (current volume).

The volume control unit 703 may increase the volume of each of the projectors 101-1 and 101-2 so that the volume of the audio output from the display system 100 as a whole does not decrease (or so that decrease in the volume is suppressed) even when the projector 101-3 stops outputting the audio output.

In steps S817 and S818, the volume control unit 703 of the reproduction control unit 512 instructs each of the projectors 101-1 and 101-2 to change the current value of volume (current volume) to the value of the volume determined in step S816.

In step S819, the output control unit 508 of the projector 101-1 changes the volume of the audio, which is being output, in accordance with the instruction from the reproduction control unit 512. In substantially the same manner, in step S820, the output control unit 508 of the projector 101-2 changes the volume of the audio, which is being output, in accordance with the instruction from the reproduction control unit 512.

Figure 10:
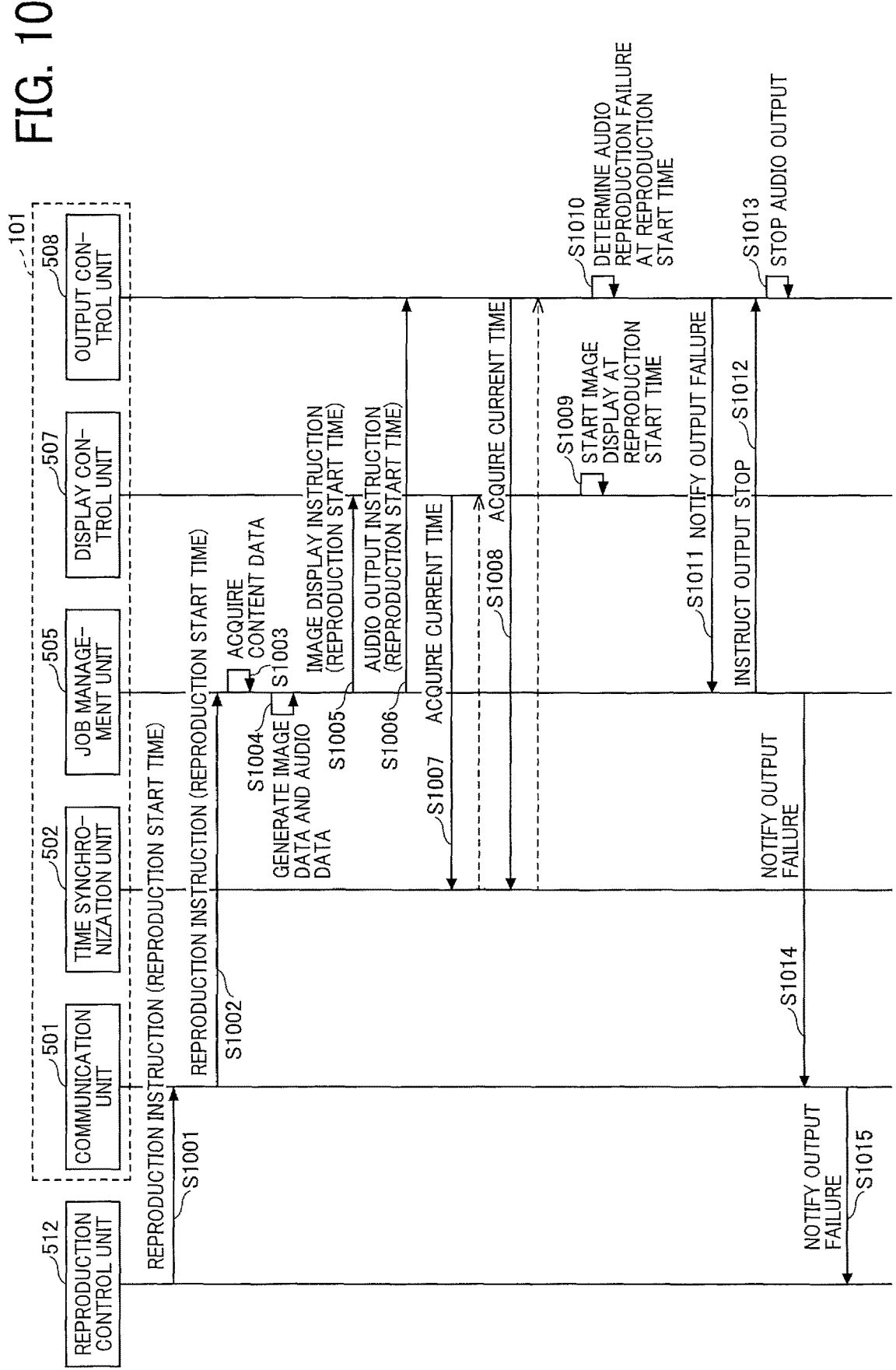
FIG. 10 is a sequence diagram illustrating an example of processing of a projector according to one or more embodiments.

Processing of Projector:

FIG. 10 is a sequence diagram illustrating an example of processing of a projector according to the first embodiment. The processing is performed when the projector 101 receives a reproduction instruction including a reproduction start time from the reproduction control unit 512.

In step S1001, the communication unit 501 of the projector 101 receives the reproduction instruction including the reproduction start time from the reproduction control unit 512. In response to the reproduction instruction, in step S1002, the communication unit 501 notifies the job management unit 505 of the received reproduction instruction.

In step S1003, the job management unit 505 uses the content acquisition unit 503 to acquire the content data including the image data (original image data) and the audio data (original audio data) from, for example, the USB memory 105.

In step S1004, the job management unit 505 uses the content processing unit 504 to generate, based on the content data, the image data to be used by the display control unit 507 to display the moving image 109 and the audio data to be used by the output control unit 508 to output the audio. For example, the content processing unit 504 acquires the original image data from the content data, decodes the original image data, and generates, by scaling the original image data according to the resolution of the projector 101 as necessary, the image data to be used for displaying the moving image 109. In addition, the content processing unit 504 acquires the original audio data from the content data and decodes the original audio data to generate the audio data to be used for outputting the audio.

The job management unit 505 may skip the processing of step S1004 if the image data and audio data are stored, in the USB memory 105 or the like, in a format that does not require the above-described processing.

In step S1005, the job management unit 505 notifies the display control unit 507 of an image display instruction to display the moving image 109 based on the generated image data. The image display instruction includes information indicating a reproduction start time at which the display of the moving image 109 starts.

In step S1006, the job management unit 505 notifies the output control unit 508 of an audio output instruction to output the audio based on the generated audio data. The audio output instruction includes information indicating a reproduction start time at which the audio output starts.

In step S1007, upon receiving the image display instruction from the job management unit 505, the display control unit 507 acquires a current time from the time synchronization unit 502. Similarly, in step S1008, upon receiving the audio output instruction from the job management unit 505, the output control unit 508 acquires a current time from the time synchronization unit 502.

In steps S1007 and S1008, when the time synchronization unit 502 is a time synchronization server, the time synchronization unit 502 notifies each of the display control unit 507 and the output control unit 508 of the current time managed by the time synchronization unit 502 (own server). Alternatively, when the time synchronization unit 502 is a time synchronization client, the time synchronization unit 502 notifies each of the display control unit 507 and the output control unit 508 of the current time after synchronizing a time with the time synchronization server.

In step S1009, the display control unit 507 starts displaying the moving image 109 at the reproduction start time.

In step S1010, the output control unit 508 determines that the audio (sound) is failed to be reproduced at the reproduction start time, for example, by performing the process described with reference to FIG. 9. In this case, in step S1011, the output control unit 508 notifies the job management unit 505 that the audio (sound) is failed to be reproduced at the reproduction start time.

In step S1012, the job management unit 505 instructs the output control unit 508 to stop outputting the audio (audio output). Accordingly, in step S1013, the output control unit 508 stops outputting the audio (audio output).

The processing of steps S1012 and S1013 is an example. For example, in step S1010, when it is determined that the audio is failed to be reproduced at the reproduction start time, the output control unit 508 may stop the audio output without an instruction from the job management unit 505.

In steps S1014 and S1015, the job management unit 505 notifies the reproduction control unit 512 via the communication unit 501 that the audio (sound) is failed to be reproduced at the reproduction start time.

Through the above-described process, the display system 100 according to the first embodiment reduces an audio error of a time difference, or a mismatch, in the audio output from the plurality of projectors 101 even when any of the plurality of projectors 101 fails to start the audio output at the predetermined time. In addition, for example, even when the projector 101-3 stops or cancels outputting the audio (audio output), the display system 100 increases the volume of the other projectors 101-1 and 101-2 and maintains a certain amount of volume of the audio output from the entire display system 100.

Second Embodiment

In the first embodiment, the case where the projector 101 fails to perform the audio output at the reproduction start time is described. As a factor of an audio error of mismatch in the audio, there is a case where the time synchronization is not correctly performed due to disconnection from a network or the like.

A description is given below of a second embodiment in which the projector 101 is disconnected from a network. A system configuration, a hardware configuration, and a functional configuration of the display system 100 according to the second embodiment are substantially the same as those of the first embodiment.

Figure 11:
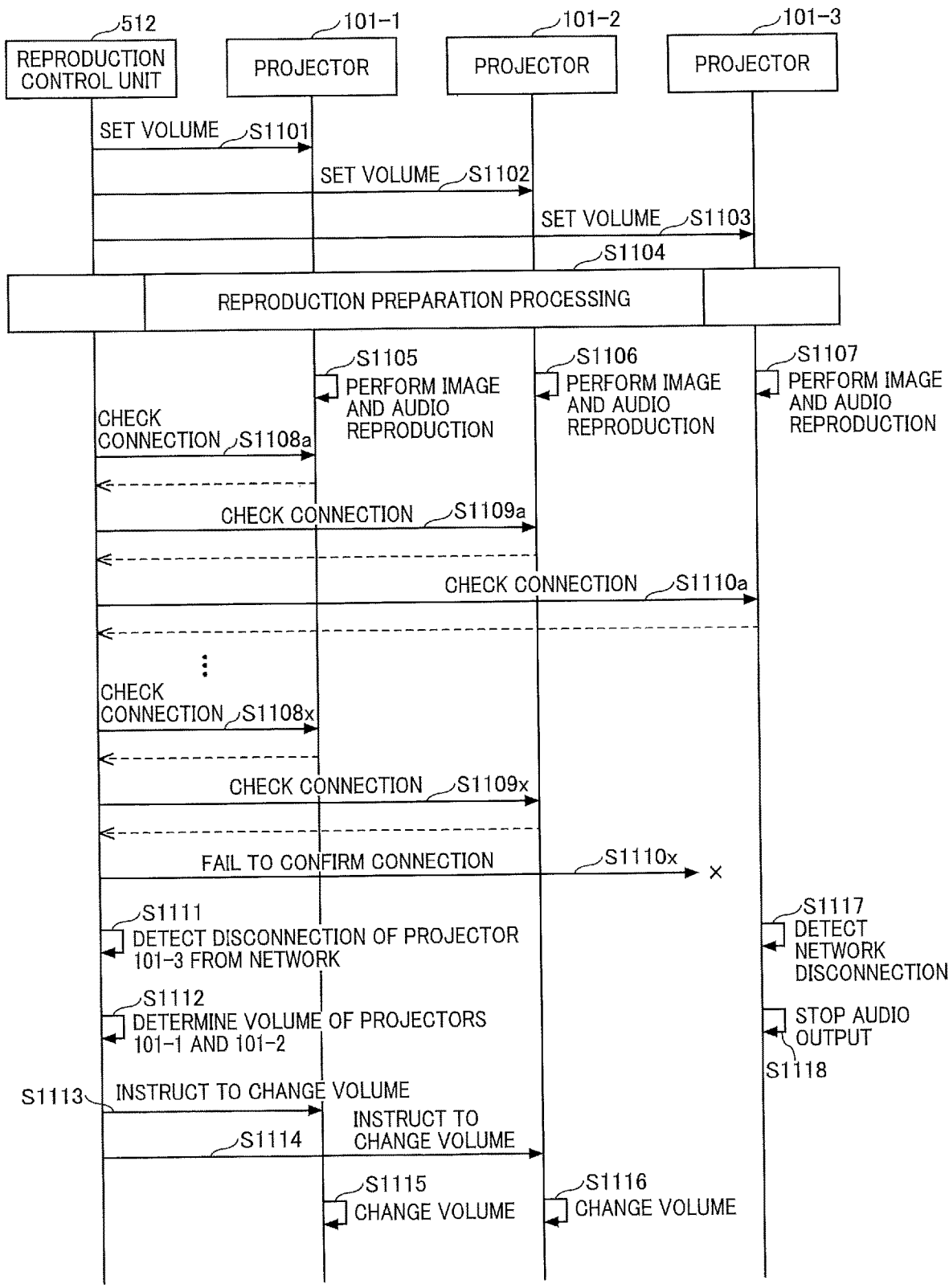
FIG. 11 is a sequence diagram illustrating another example of processing of a display system according to one or more embodiments.
Figure 12:
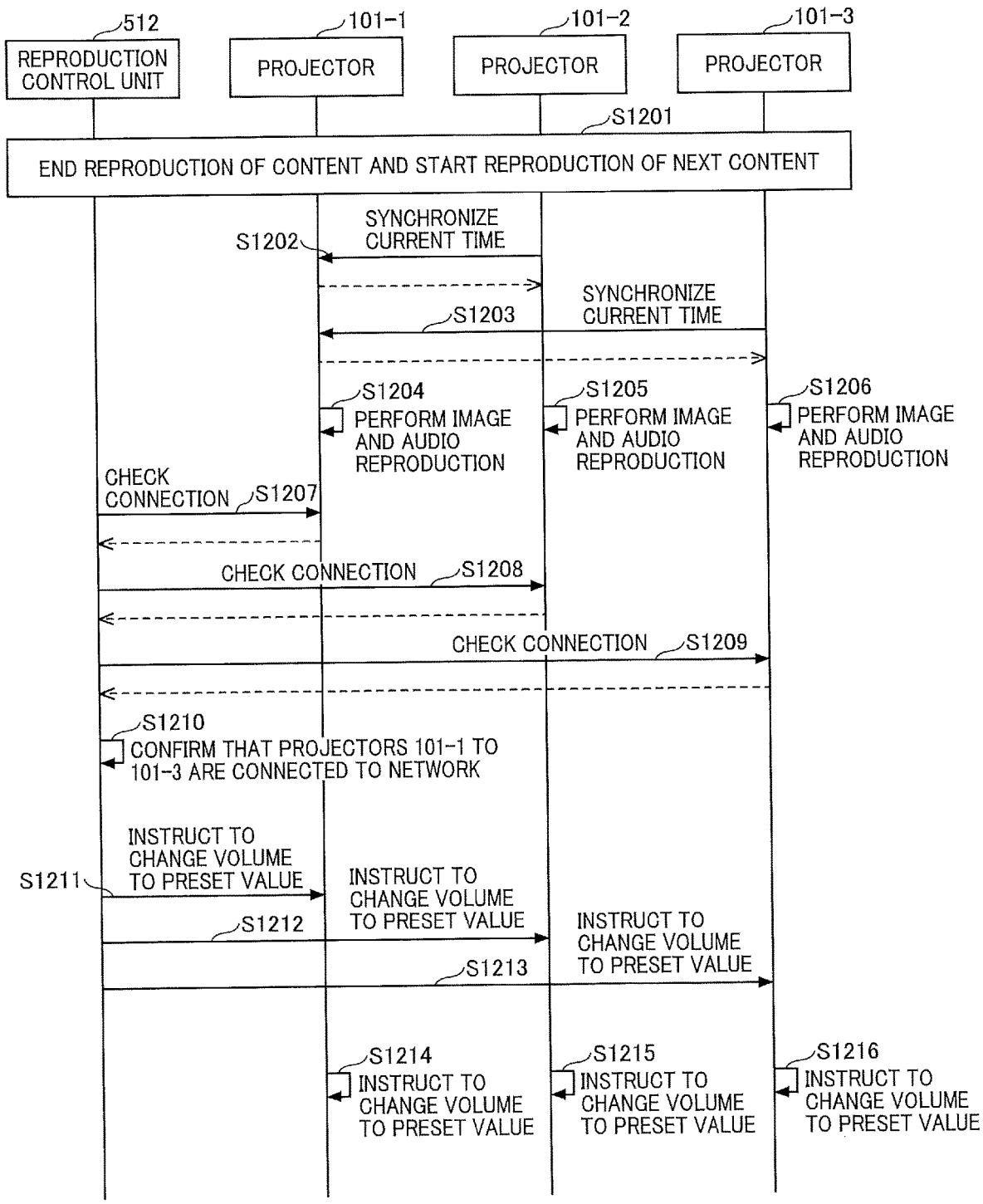
FIG. 12 is a sequence diagram illustrating still another example of processing of a display system according to one or more embodiments.

Process:

Processing of Display System:

FIG. 11 and FIG. 12 are sequence diagrams each illustrating an example of processing of a display system according to the second embodiment.

In steps S1101 to S1103, the volume control unit 703 of the reproduction control unit 512 sets a volume setting of each of the projectors 101-1 to 101-3 to set the volume to the preset value or a default value.

The processing of each of these steps may be, for example, steps S801 to S803 illustrated in FIG. 8, in which the volume control unit 703 of the reproduction control unit 512 acquires, from each of the projectors 101-1 to 101-3, volume (volume setting value) set in each of the projectors 101.

In step S1104, the display system 100 performs reproduction preparation processing as illustrated in steps S804 to S809 of FIG. 8, for example.

In steps S1105 to S1107, the job management unit 505 of each of the projectors 101-1 to 101-3 performs the reproduction processing of displaying (outputting) the moving image 109 and outputting the audio based on the content stored in advance in the USB memory 105 or the like. In the description of the present embodiment, it is assumed that each of the projectors 101-1 to 101-3 successfully starts displaying the moving image 109 and outputting the audio at the reproduction start time.

In steps S1108*a* to S1110*a*, the status management unit 702 of the reproduction control unit 512 transmits a connection check message to each of the projectors 101-1 to 101-3 and receives a response to the message from each of the projectors 101-1 to 101-3. Through this processing, if one of the projectors 101 does not respond to the connection check message, the status management unit 702 determines that the one of the projectors 101 is disconnected from the network. Note that the status management unit 702 repeatedly performs the same processing, the processing of steps S1108*a* to S1110*a*, at predetermined time intervals, for example.

For example, in steps S1108*x* to S1110*x*, the status management unit 702 of the reproduction control unit 512 transmits another connection check message to each of the projectors 101-1 to 101-3 and fails to confirm the connection of the projector 101-3. In this case, in step S1111, the status management unit 702 of the reproduction control unit 512 detects that the projector 101-3 is disconnected from the network.

In step S1112, the volume control unit 703 of the reproduction control unit 512 determines a value of the volume of each of the other projectors 101-1 and 101-2 in a manner that the volume of the audio output from each of the other projectors 101-1 and 101-2 is larger than a current value of the volume (current volume).

The volume control unit 703 may increase the volume of each of the projectors 101-1 and 101-2 so that the volume of the audio output from the display system 100 as a whole does not decrease (or so that decrease in the volume is suppressed) even when the projector 101-3 stops outputting the audio output.

In steps S1113 and S1114, the volume control unit 703 of the reproduction control unit 512 instructs each of the projectors 101-1 and 101-2 to change the current volume to the value of the volume determined in step S1112.

In step S1115, the output control unit 508 of the projector 101-1 changes the volume of the audio, which is being output, in accordance with the instruction from the reproduction control unit 512. In substantially the same manner, in step S1116, the output control unit 508 of the projector 101-2 changes the volume of the audio, which is being output, in accordance with the instruction from the reproduction control unit 512.

The disconnection of network connection of the projector 101-3 may also be detected by the communication unit 501 of the projector 101-3 in step S1117, for example. Accordingly, in step S1118, the output control unit 508 of the projector 101-3 stops the audio output.

As described above, when the network connection of one of the projectors 101 is disconnected, the display system 100 according to the second embodiment determines that the audio output may not be performed at a predetermined time and stops or cancels the audio output of the one of the projectors 101.

Following the above processing, in step S1201 of FIG. 12, the display system 100 ends the reproduction of the content and starts reproduction of next content, for example. The next content may be different from or the same as the content reproduced in FIG. 11. In the description of the present embodiment, as an example, it is assumed that the next content same as the content reproduced in FIG. 11 and is set in advance so as to be repeatedly reproduced at a predetermined time interval (for example, every five minutes) from the first reproduction start time.

In step S1202, the time synchronization unit (client) 502*b* of the projector 101-2 communicates with the time synchronization unit (server) 502*a* of the projector 101-1 to synchronize the current time with the projector 101-1.

In step S1203, the time synchronization unit (client) 502*b* of the projector 101-3 communicates with the time synchronization unit (server) 502*a* of the projector 101-1 to synchronize the current time with the projector 101-1. It is assumed that the projector 101-3 reconnected to the network at this time, namely has been connected to the network again by this time.

In steps S1204 to S1206, the job management unit 505 of each of the projectors 101-1 to 101-3 performs the reproduction processing of displaying (outputting) the moving image 109 and outputting the audio based on the content data stored in advance in the USB memory 105 or the like. In the description of the present embodiment, it is assumed that each of the projectors 101-1 to 101-3 successfully starts displaying the moving image 109 and outputting the audio at the reproduction start time.

In steps S1207 to S1209, the status management unit 702 of the reproduction control unit 512 transmits a connection check message to each of the projectors 101-1 to 101-3 and receives a response to the message from each of the projectors 101-1 to 101-3.

In step S1210, the status management unit 702 of the reproduction control unit 512 confirms that the projectors 101-1 to 101-3 are connected to the network. In this case, in steps S1211 to S1213, the volume control unit 703 of the reproduction control unit 512 instructs the projectors 101-1 to 101-3 to change the volume to the preset value (for example, the volume acquired in steps S801 to S803 of FIG. 8).

In steps S1214 to S1216, the output control unit 508 of each of the projectors 101-1 to 101-3 sets the volume of the audio, which is being output, to the preset value in accordance with an instruction from the reproduction control unit 512.

As described above, when all the projectors 101 are able to perform the audio output at the reproduction start time and there is no error in the network connection, the display system 100 according to the second embodiment restarts the audio output with the projector 101 that has stopped or canceled the audio output.

Figure 13:
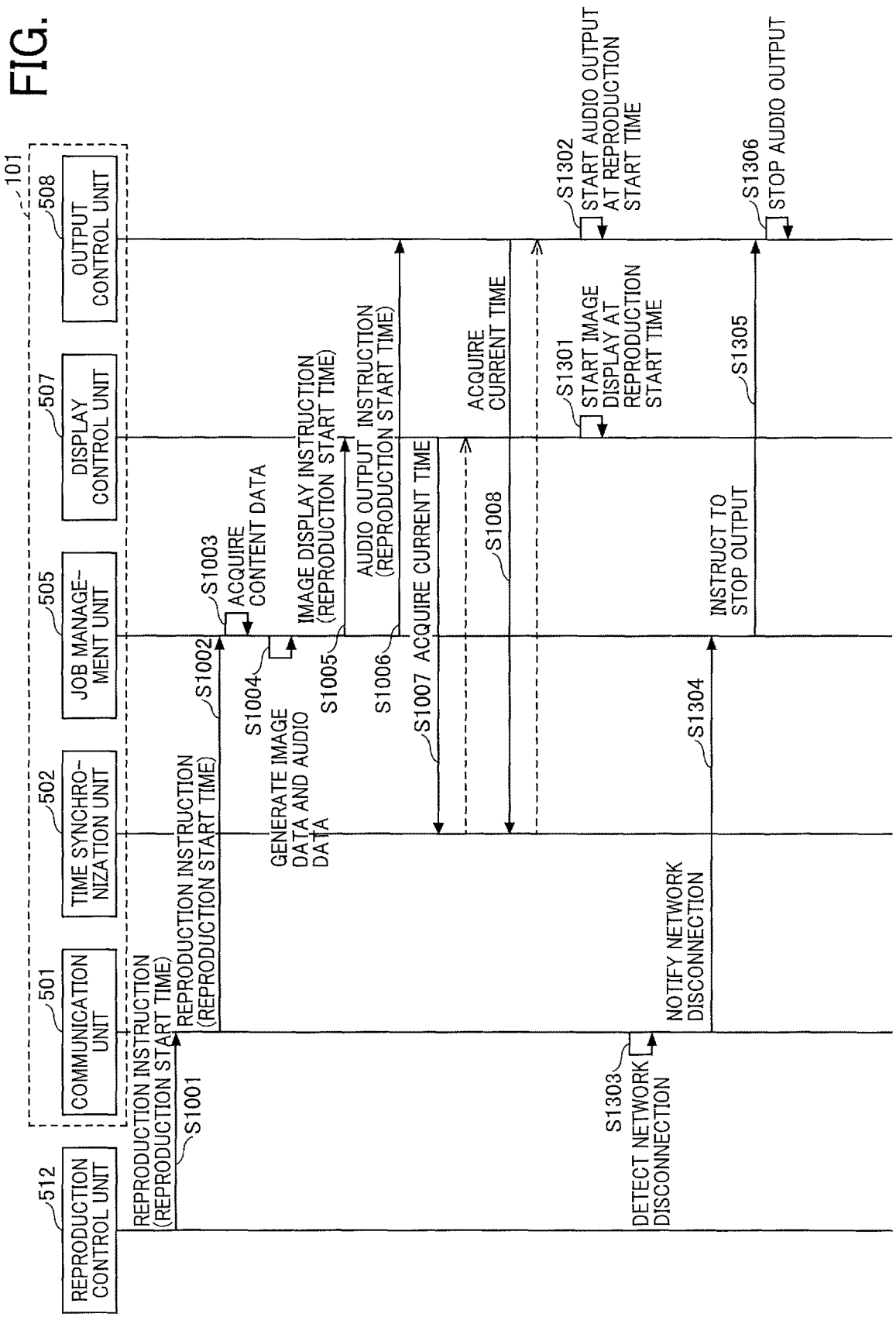
FIG. 13 is a sequence diagram illustrating another example of processing of a projector according to one or more embodiments.

Processing of Projector:

FIG. 13 is a sequence diagram illustrating an example of processing of a projector according to the second embodiment. The processing illustrated in FIG. 13 corresponds to the processing of one of the projectors 101 in the processing of the display system 100 described with reference to FIG. 11. Among the steps illustrated in FIG. 13, the processing of steps S1001 to S1008 are substantially the same as the processing of the steps S1001 to S1008 in FIG. 10 performed by the projector 101 according to the first embodiment. Accordingly, the following description focuses on differences from the first embodiment.

In step S1301, the display control unit 507 starts displaying the moving image 109 at the reproduction start time. In step S1302, the output control unit 508 starts outputting the audio (audio output) at the reproduction start time.

From the above-described state, for example, in step S1303, the communication unit 501 detects the disconnection from the network. In this case, in step S1304, the communication unit 501 notifies, for example, the job management unit 505 of a network disconnection notification indicating that the projector 101 is disconnected from the network.

In step S1305, the job management unit 505 instructs the output control unit 508 to stop the audio output. Accordingly, in step S1306, the output control unit 508 stops the audio output.

Third Embodiment

In the first and second embodiments, the reproduction control unit 512 controls the volume (audio volume) of each of the projectors 101. However, after the reproduction preparation for the content is completed, the audio volume may be controlled by the projectors 101-1 to 101-3 without the control of the reproduction control unit 512.

Figure 14:
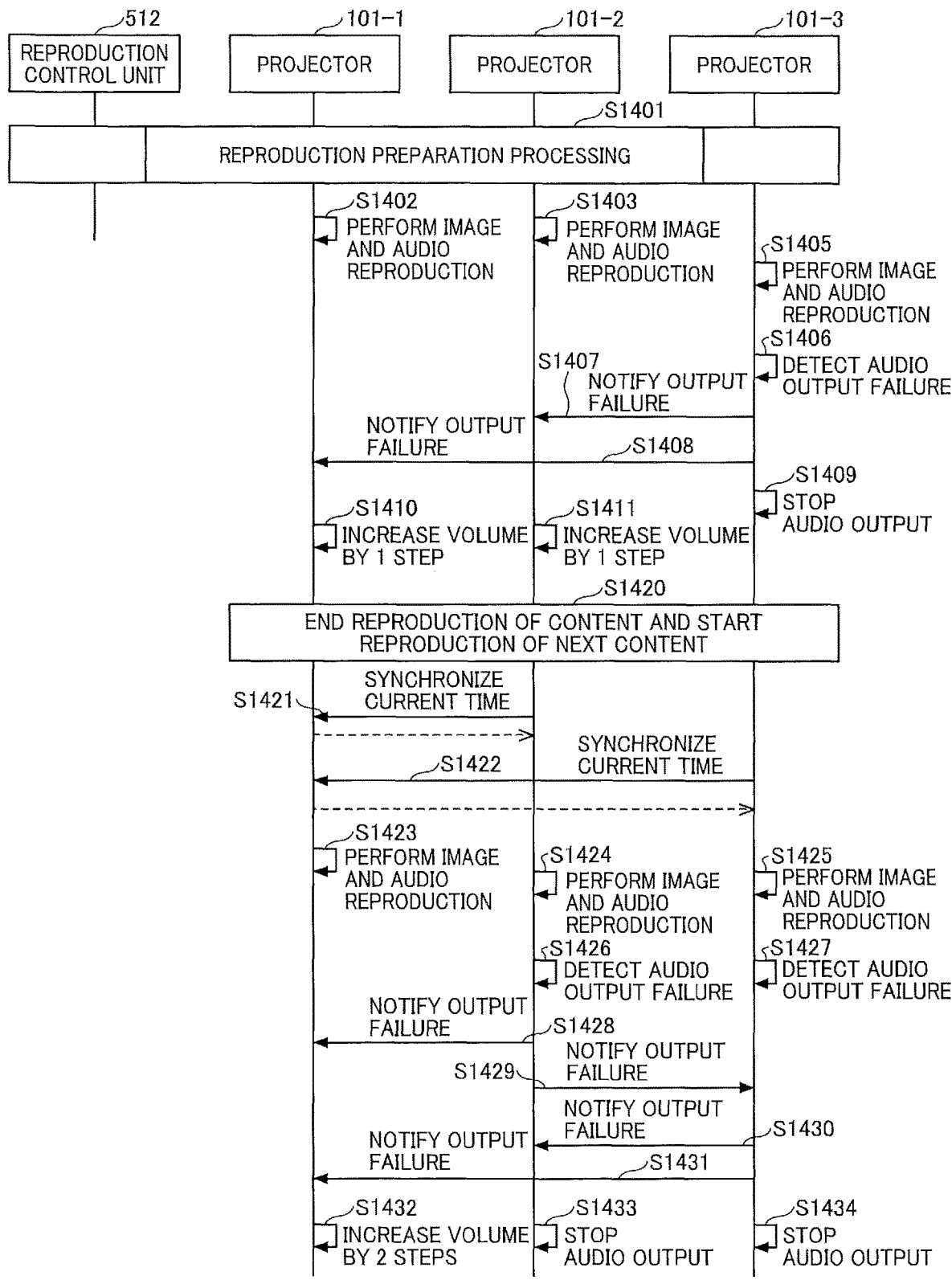
FIG. 14 is a sequence diagram illustrating still another example of processing of a display system according to one or more embodiments.

FIG. 14 is a sequence diagram illustrating an example of processing of a display system according to a third embodiment.

In step S1401, the display system 100 performs reproduction preparation processing in substantially the same manner as the processing of the steps S801 to S809 illustrated in FIG. 8, for example.

In steps S1402 to S1405, the job management unit 505 of each of the projectors 101-1 to 101-3 performs the reproduction processing of displaying (outputting) the moving image 109 and outputting the audio based on the content data stored in advance in the USB memory 105 or the like.

In the description of the present embodiment, it is assumed that the projectors 101-1 and 101-2 successfully start displaying the moving image 109 and outputting the audio at the reproduction start time. In addition, it is assumed that the projector 101-3 detects that the audio output is failed to be performed at the reproduction start time in step S1406.

In steps S1407 and S1408, the output control unit 508 of the projector 101-3 transmits to each of the other projectors 101-1 and 101-2 of an output failure notification indicating that the audio output is failed to be started at the reproduction start time. It is assumed that destination information of other projectors included in the display system 100 is set in advance in each projector 101.

In step S1409, the output control unit 508 of the projector 101-3, which has transmitted the output failure notification, stops the audio output.

In steps S1410 and 1411, each output control unit 508 of corresponding one of the projectors 101-1 and 101-2, each of which has received the output failure notification, increases the audio volume by one step (for example, about 1 to 3 dB) from a preset value.

As described above, according to the third embodiment, the output control unit 508 of the projector 101 that is able to start the audio output at the reproduction start time increases the volume of the audio output by the output control unit 508 in case one of the other projectors 101 fails to perform the audio output at the reproduction start time.

In step S1420, it is assumed that the reproduction of the content is terminated, and the reproduction of the next content is started.

In steps S1421 and S1422, the time synchronization units 502 of each of the projectors 101-2 and 101-3 synchronizes the current time with the projector 101-1.

In steps S1423 to S1425, the job management unit 505 of each of the projectors 101-1 to 101-3 performs reproduction processing of displaying (outputting) the moving image 109 and outputting the audio based on the content data stored in advance in the USB memory 105 or the like.

In the description of the present embodiment, it is assumed that the projector 101-1 successfully starts displaying the moving image 109 and outputting the audio at the reproduction start time. On the other hand, it is assumed that the output control units 508 of each of the projectors 101-2 and 101-3 detects the audio output failure at the reproduction start time.

In this case, in steps S1428 and S1429, the output control unit 508 of the projector 101-2 transmits, to the other projectors 101-1 and 101-3, an output failure notification indicating that the audio output is failed to be started at the reproduction start time. In a similar manner, in steps S1430 and S1431, the output control unit 508 of the projector 101-3 transmits to each of the other projectors 101-1 and 101-2 of an output failure notification indicating that the audio output is failed to be started at the reproduction start time.

In step S1432, the output control unit 508 of the projector 101-1 increases the audio volume by two steps (for example, approximately 2 to 3 dB), because the output failure notifications are received from the two projectors 101-2 and 101-3.

In steps S1433 and S1434, the output control unit 508 of each of the projectors 101-2 and 101-3, each of which has transmitted the output failure notification, stops the audio output.

As described above, according to the third embodiment, the output control unit 508 of the projector 101 that is able to start the audio output at the reproduction start time changes the volume of the audio output by the output control unit 508 according to the number of the other projectors 101 failing to perform the audio output at the reproduction start time.

According to the third embodiment, for example, the system configuration illustrated in FIG. 1 allows the user to disconnect the information terminal 102 from the display system 100 after the reproduction preparation processing is performed with the information terminal 102.

According to the above-described embodiments of the present disclosure, the display system 100 that reproduces content including an image and audio by synchronizing reproduction times between a plurality of display devices prevents a time difference, or a mismatch in the audio output from the plurality of display devices, namely prevents a situation in which one or more of the plurality of display devices output the audio at a time that is different from a reproduction time of the other of the plurality of display devices.

In the above-described embodiments, the display system 100 performs multi-projection in which a predetermined image is projected on a large screen larger than a projection screen of each of the projectors 101 using the plurality of projectors 101-1 to 101-3. However, the present disclosure is not limited thereto, and is also applicable to the display system 100 that performs stack projection in which a predetermined image is projected onto a high-luminance screen brighter than the projection screen of each of the projectors 101 using the plurality of projectors 101-1 to 101-3.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

For example, the information terminal 102 and the projector 101 illustrated in FIG. 5 may be configured to share the processing of the display system 100 illustrated in FIG. 8, FIG. 11, and FIG. 12 in various combinations. For example, processing performed by a predetermined unit may be performed by the information terminal 102. Similarly, the function of a particular unit may be performed by the projector 101.

In a conventional image processing system in which a plurality of projectors and an information processing device are connected to each other by wireless communications, an error in relation to an output time may occur in outputting an image and audio reproduced by each of the plurality of projectors, due to a network disconnection, for example. In such a case, audio output from one or more of the plurality of projectors may not be performed in concurrent with the audio output from the other of the plurality of projectors, namely a time difference may occur in the audio output from the plurality of projectors.

In addition, users are more likely to perceive an error in relation to a time difference occurring in outputting (reproducing) the audio than an error in relation to a time difference in displaying (reproducing) a moving image, and this gives an uncomfortable impression to the users hearing the audio having a mismatch corresponding to the time difference occurring in the audio output from the plurality of projectors.

An occurrence of such an error of time difference in outputting content is not limited to a multi-projection system in which an image is displayed on a large screen by using a plurality of projectors, but such an error may commonly occur in display systems in each of which an image is displayed as or on a large screen using a plurality of display devices, such as a plurality of displays, by synchronizing a reproduction time between the plurality of display devices.

According to one or more embodiments of the present disclosure, a display system that reproduces content including an image and audio by synchronizing reproduction times between a plurality of display devices prevents a time difference (mismatch) in audio output from the plurality of display devices, namely prevents a situation in which one or more of the plurality of display devices output the audio at a different reproduction time from the other of the plurality of display devices.

According to one or more embodiments, a non-transitory recording medium storing a plurality of instructions which, when executed by one or more processors, cause the processors to perform a display method is provided. The display method includes starting displaying a corresponding part of an image at a predetermined time. The corresponding part of the image is included in content, and the image is displayed by a plurality of display devices that synchronizes time to reproduce the content. The display method includes starting outputting audio at the predetermined time, the audio being included in the content. The display method further includes stopping outputting the audio in response to detection of one of a failure and a probability of failing to output the audio at the predetermined time.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A display system, comprising
a plurality of display devices each of which includes circuitry,
the circuitry of each of the plurality of display devices being configured to:
synchronize a reproduction time with other of the plurality of display devices, the reproduction time being a time to reproduce content including an image and audio;
start displaying the image at a predetermined time; and
start outputting the audio at the predetermined time,
wherein, in response to detection of one of a failure and a probability of failure to output the audio at the predetermined time, the circuitry further stops outputting the audio, and the display system further comprising additional circuitry configured to control reproduction of the content, wherein, in case that the one of the plurality of display device fails to or has a probability of failing to start outputting the audio at the predetermined time, the additional circuitry increases audio volume of the other of the plurality of display devices.

2. The display system of claim 1,
wherein the circuitry of each of the plurality of display devices
connects a corresponding one of the plurality of the display devices to a communication network, and
synchronizes time with other of the plurality of display devices through the communication network,
wherein, in case that the corresponding one of the plurality of the display devices is disconnected from the communication network, the circuitry further stops outputting the audio.

3. The display system of claim 1,
wherein, in response to a failure to communicate with the one of the plurality of display devices, the additional circuitry increases the audio volume of the other of the plurality of display devices.

4. The display system of claim 1,
wherein the additional circuitry sets the audio volume to a same value as one being set to the plurality of display devices as a whole before the one of the plurality of display devices stops outputting the audio.

5. The display device of claim 1,
wherein, in case that each of the plurality of display devices starts the reproduction of the content at a next predetermined time, the additional circuitry
resets the audio volume set to the plurality of display devices as a whole, and
sets audio volume of each of the plurality of display devices to a preset value.

6. The display device of claim 1,
wherein, in case that one of the plurality of display devices fails to output the audio at the predetermined time, and the plurality of display devices other than the one of the plurality of display devices successfully starts outputting the audio at the predetermined time, the circuitry of each of the plurality of display devices other than the one of the plurality of display devices increases audio volume of a corresponding one of the plurality of display device.

7. A display device, comprising
circuitry configured to:
synchronize a reproduction time with other one or more display devices, the reproduction time being a time to reproduce content including an image and audio;
start displaying the image at a predetermined time; and
start outputting the audio at the predetermined time,
wherein, in response to detection of one of a failure and a probability of failure to output the audio at the predetermined time, the circuitry further stops outputting the audio, and the display device further comprising
additional circuitry configured to control reproduction of the content,
wherein, in case that the one of the other one or more display devices fails to or has a probability of failing to start outputting the audio at the predetermined time, the additional circuitry increases audio volume of the other of the plurality of display devices.

8. A display method, comprising:
starting displaying a corresponding part of an image at a predetermined time, the corresponding part of the image being included in content, the image being displayed by a plurality of display devices synchronizing time to reproduce the content; and
starting outputting audio at the predetermined time, the audio being included in the content,
wherein, in response to detection of one of a failure and a probability of failure to output the audio at the predetermined time, the method further comprising stopping outputting the audio, and in case that the one of the plurality of display device fails to or has a probability of failing to start outputting the audio at the predetermined time, the method additionally comprising increasing audio volume of the other of the plurality of display devices.

* * * * *